(12) United States Patent
De Jong et al.

(10) Patent No.: US 6,921,227 B1
(45) Date of Patent: Jul. 26, 2005

(54) RETAINING SPRING FOR DETACHABLY CONNECTING TWO COMPONENTS

(75) Inventors: Michael De Jong, Binzen (DE); Frank Lindemann, Weil am Rhein (DE)

(73) Assignee: A. Raymond & CIE, Grenoble (FR)

( * ) Notice: Subject to any disclaimer, the term of this patent is extended or adjusted under 35 U.S.C. 154(b) by 0 days.

(21) Appl. No.: 10/415,634

(22) PCT Filed: Oct. 18, 2001

(86) PCT No.: PCT/EP01/12070

§ 371 (c)(1),
(2), (4) Date: May 1, 2003

(87) PCT Pub. No.: WO02/36374

PCT Pub. Date: May 10, 2002

(30) Foreign Application Priority Data

Nov. 2, 2000 (DE) ................. 100 54 334

(51) Int. Cl.⁷ ............. F16B 1/00; B60J 17/02
(52) U.S. Cl. ........ 403/329; 403/321; 403/326; 296/224; 292/80; 292/85
(58) Field of Search .......... 403/80, 112, 321, 403/322.1, 322.4, 326, 328, 329; 294/224; 292/80, 81, 83, 85, 87, 88, 89, DIG. 38, DIG. 61, 292/DIG. 63; 296/224; 24/295, 492, 515, 24/543, 581.1, 662

(56) References Cited

U.S. PATENT DOCUMENTS

| | | | | |
|---|---|---|---|---|
| 371,749 A | * | 10/1887 | Fitzpatrick et al. ........... 24/662 |
| 1,346,263 A | * | 7/1920 | Settlage ................. 292/113 |
| 1,394,962 A | * | 10/1921 | Bate ..................... 292/113 |
| 3,429,603 A | * | 2/1969 | Gejoff .................... 292/80 |
| 3,519,298 A | * | 7/1970 | Gley et al. ............... 292/113 |
| 3,560,731 A | * | 2/1971 | Burton .................... 292/87 |
| 4,280,254 A | | 7/1981 | Racke .................... 24/336 |
| 4,758,031 A | * | 7/1988 | Wolf ..................... 292/113 |
| 4,790,579 A | * | 12/1988 | Maxwell et al. ..... 292/DIG. 61 |

(Continued)

FOREIGN PATENT DOCUMENTS

DE 40 31 017 A 4/1992

(Continued)

Primary Examiner—Robert J. Sandy
Assistant Examiner—Ruth C. Rodriguez
(74) Attorney, Agent, or Firm—Gifford, Krass, Groh, Sprinkle, Anderson, & Citkowski, P.C.

(57) ABSTRACT

The retaining spring is used for detachably connecting two components. The retaining spring includes a retaining plate attached to one component and an engagement spring which is moveably guided on the retaining plate between an engagement position and a released position in the direction of attachment. The engagement spring is provided with a catch edge for securing over an engagement projection which is provided on the other component. A slanted insert limb used to raise the engagement spring when the slidable component is moved in the direction of attachment. In order to connect and detach the two components with greater ease, even when space is lacking in the area immediately surrounding the connection points, the engagement spring is maintained in a position of engagement on the retaining plate by an engagement means acting against the resistance of the spring in the direction of attachment.

14 Claims, 2 Drawing Sheets

U.S. PATENT DOCUMENTS

| | | | |
|---|---|---|---|
| 5,598,611 A * | 2/1997 | Yamada et al. | 24/581.1 |
| 6,149,451 A * | 11/2000 | Weber | 439/358 |
| 6,309,007 B1 * | 10/2001 | Essig et al. | 296/103 |
| 2002/0021061 A1 * | 2/2002 | Lammens | |

FOREIGN PATENT DOCUMENTS

| | | |
|---|---|---|
| FR | 1 399 990 A | 5/1965 |
| FR | 86 990 E | 5/1966 |

* cited by examiner

RETAINING SPRING FOR DETACHABLY CONNECTING TWO COMPONENTS

BACKGROUND OF THE INVENTION

1. Field of the Invention

The invention pertains to a retaining spring for detachable connection of two components, as is known, for example, from DE 40 31 017C2.

2. Reference to Related Art

Retaining springs of this type are used for securing a sliding component with respect to a fixed component, such as an automobile sun-roof in the roof of a motor vehicle. The retaining spring in this regard is usually secured to the fixed component, whereas a corresponding catch protrusion is provided on the sliding component. This catch protrusion initially presses up against the retaining spring when the sliding component moves up, so that the catch protrusion slides past an insertion leg. As soon as the catch protrusion has passed a catch edge of the retaining spring, the retaining spring again springs back into its initial position. To release the catch connection, the retaining spring is pushed upward until the catch protrusion passes unhindered along the catch edge of the retaining spring when the sliding component is pulled out.

This release process can be conducted without difficulty for a connecting part only when a user has enough space to lift the retaining spring with one hand, and, at the same time, use the other hand to push the sliding component away from the fixed component. But if it is a matter of dealing with the securing of components with several connection sites and if they are closely surrounded by an outer wall, then the user will have great difficulty in releasing the various retaining springs merely by using hands or fingers and simultaneously pulling off the sliding component.

The problem of the invention is to provide a solution and to design the aforementioned retaining spring so that the sliding component can be easily released, even when several connection sites and restricted spatial conditions are present, and so that it then can again be retracted back into position.

SUMMARY OF THE INVENTION

The problem is solved essentially in that an engagement spring is formed as a separate part and is adapted to be guided and slide along a retaining plate in the closing direction between an engagement position and a release position; wherein the engagement position is maintained by the catch elements that can be overcome by a spring force in the closing direction.

The connection established by the retaining spring according to the present invention can be released by the user in a simple manner, in that an insertion leg of each retaining spring is first pressed upward. Then, the engagement springs are pushed back to a stop. After all connecting parts have been unencumbered, a sliding component can be withdrawn without any effort. For reinstallation of the retaining spring the engagement spring must again be pulled back into the front catch step where it is held by spring force. A catch protrusion of the sliding component can then easily be introduced under a catch edge until it catches in place.

According to one preferred embodiment of the invention, the catch elements are formed in such a way that a spring-loaded latch is incorporated in the retaining plate and a corresponding recess is provided in the sliding part of the engagement spring into which the latch engages. Here, it is helpful if the resistance to the release of the latch is greater than the resistance necessary to overcome the spring force of the engagement spring.

BRIEF DESCRIPTION OF THE DRAWINGS

The drawing illustrates an embodiment example of the invention, which will be explained in greater detail below. It shows.

DETAILED DESCRIPTION

Figure 1:
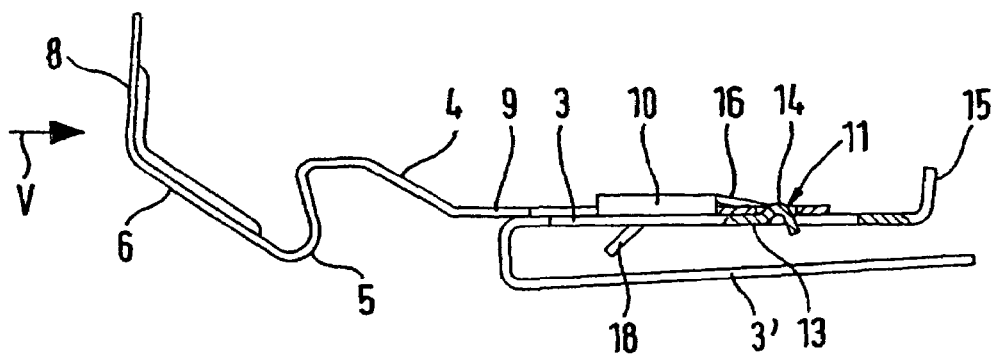
FIG. 1 A two-part retaining spring shown in a side view.
Figure 2:
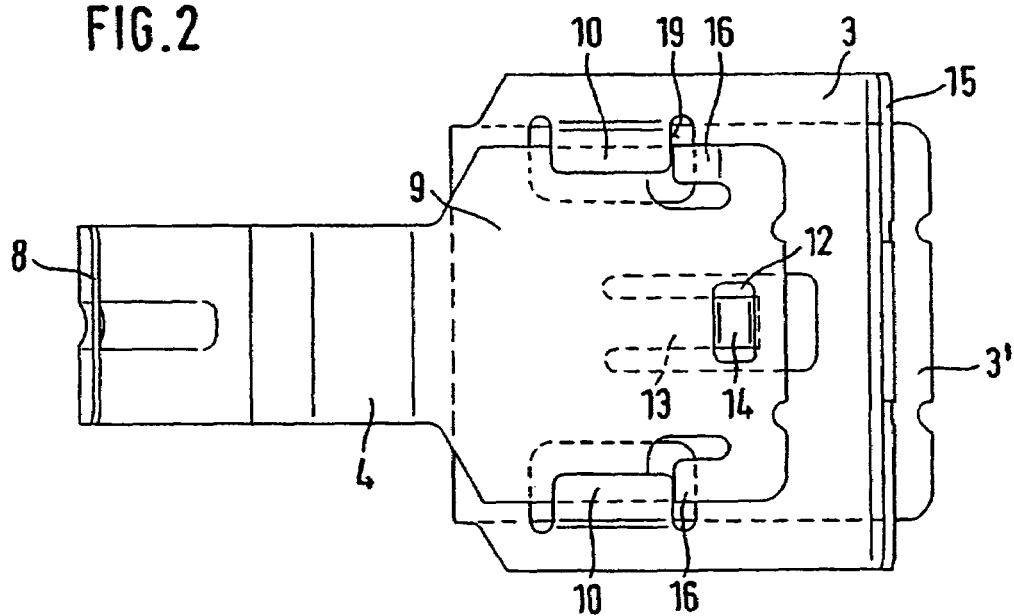
FIG. 2 The same retaining spring shown in a top view.
Figure 3:
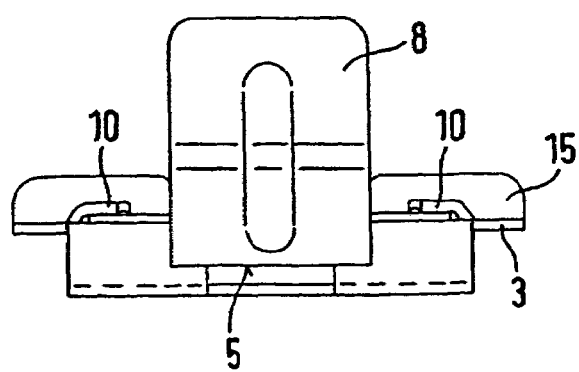
FIG. 3 The same retaining spring shown in front view along arrow V in FIG. 1.
Figure 4:
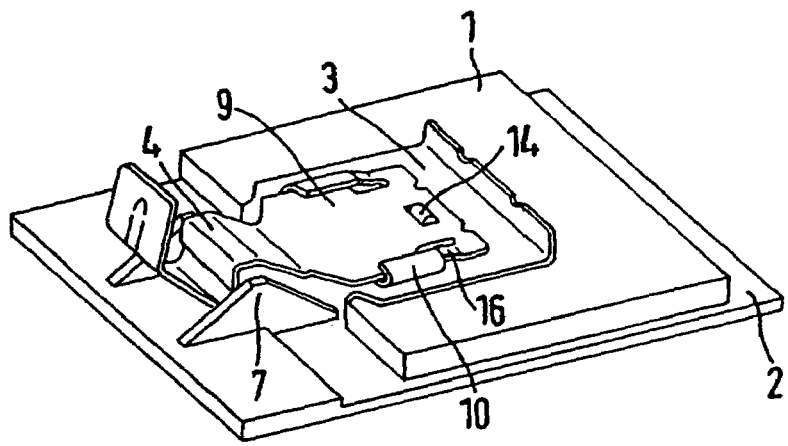
FIG. 4 The mounting condition presented in a perspective view.

The retaining spring shown in the figures is used for a detachable connection of two components that slide with respect to each other, in very restricted spatial conditions in the immediate vicinity of connected parts (not shown).

In this case, the retaining spring includes a retaining plate 3 that can be mounted to a fixed position component 1, and an engagement spring 4 formed as a separate part and that can slide on the retaining plate 3 in the insertion direction. The retaining plate 3 in the present embodiment example is connected in bracket-like form to a C-shaped clamp leg 3', and, by means of this clamp leg 3', it is set onto and clamped securely to the edge of the fixed position component 1. The engagement spring 4 is provided with a catch edge 5 so that to make a connection with the sliding component 2, it catches on to an engagement protrusion 7 molded to the sliding component 2.

The engagement spring 4 features a molded insertion leg 6 oriented at an angle in the insertion direction in front of the catch edge 5. When the sliding component 2 is inserted, the insertion leg 6 is pressed upward by the engagement protrusion 7. At the free end of the insertion leg 6 there is a retaining leg 8 that is transverse to the insertion direction. The retaining leg 8 is used both to press up the engagement spring 4 and also to pull the engagement spring 4 forward if the spring 4 has been pushed backwards, as will be described below.

On the other side of the catch edge 5, the engagement spring 4 is connected to a sliding plate 9 that rests directly upon the retaining plate 3 and can slide laterally between two guide pieces 10 located on the retaining plate 3. Specifically, the sliding plate 9 is slidable between an engagement position (FIG. 5) and a release position (FIG. 6).

The back end of the retaining plate 3 has an elevated edge stop 15 that is used to limit the rearward movement of the sliding plate 9. In addition, the side edge of the sliding plate 9 contains two spring fingers 16 that can be pushed down elastically opposite the insertion direction at an upward angle, so that upon insertion of the sliding plate 9 between the guide pieces 10, they are deflected downward and then spring back into the angled position. The angled position is configured so that the spring fingers 16 rest against the side edges 19 of the guide piece 10 and thus limit the forward movement.

In order to secure the engagement spring 4 in the engagement position, engagement features are provided that include a latch 11 and a cooperating recess 12 in the sliding plate 9 so that the latch 11 can be engaged. The latch 11 in this case is incorporated in the retaining plate 3, and a narrow strip 13 is punched out from the retaining plate 3 with standard shears, and at the spring end it is molded into a notched segment 14. In this regard it should be mentioned that the release resistance of the latch 11 is greater than the insertion resistance of the engagement spring 4, so that upon insertion of the sliding component 2, the engagement spring 4 in any case will be held securely in the engagement position when the insertion leg 6 is pressed upward.

A groove 17 at least as wide as the latch 11 is formed in the top side of the fixed position component 1, so that when the latch 11 is deflected downward, it will be unhindered when passing over the sliding plate 9. In order to have a better attachment of the bracket-like retaining plate 3 with the edge of the fixed position component 1 there is, a catch bar 18 in the middle of the retaining plate 3 that has been cut out with shears and that protrudes downward at an angle opposite the insertion direction; this bar engages with the groove 17 after pressing on the retaining clamp 3, 3'.

Figure 5:
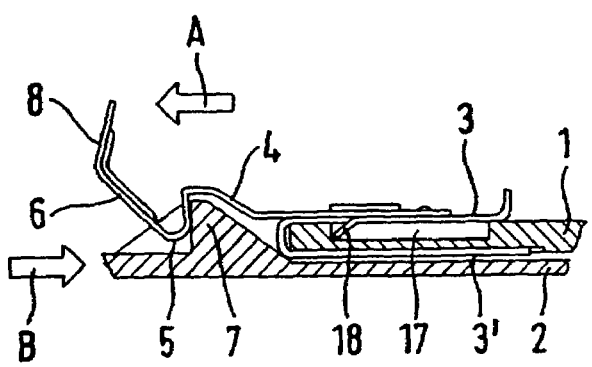
FIG. 5 A section of the components to be connected, with engaged retaining spring in the closed position.
Figure 6:
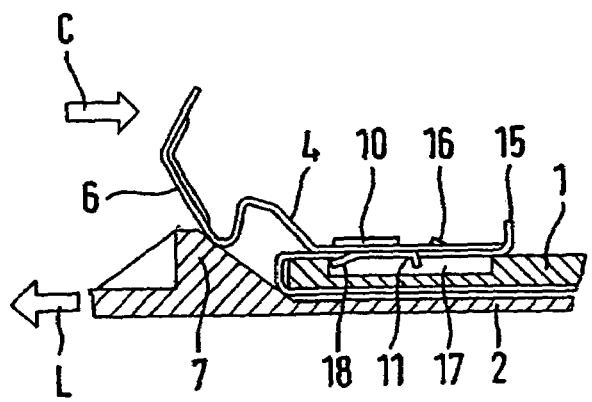
FIG. 6 The same section with the retaining spring in the open position.

The mode of operation of the two-part retaining spring is illustrated in FIGS. 5 and 6 and will be described briefly herein:

FIG. 5 shows the retaining plate 3 clamped to the fixed position component 1 with the engagement spring 4 advanced in the direction of the arrow A. The sliding component 2 is simultaneously displaced in the direction of arrow B toward the fixed position component 1, and the catch edge 5 has engaged behind the catch protrusion 7.

FIG. 6 shows the same retaining spring in the open position. In order to arrive at this position, first the insertion leg 6 must be lifted with a finger or a suitable tool, until the catch edge 5 extends over the catch protrusion 7. Then the engagement spring 4 is pushed backward in the direction of arrow C up to the stop 15 and then rests upon the back side of the catch protrusion 7, so that the sliding component 2 can be easily pulled out in the direction of arrow L.

In order to insert and engage in place the sliding component 2 again, the engagement spring 4 must be pulled back into the engagement position by pulling the retaining leg 8 opposite the direction of arrow C, until the latch 11 engages with the recess 12.

We claim:

1. A retaining spring for detachable connection of two components, comprising a retaining plate secured to a fixed component, and an engagement spring protruding from the retaining plate, where said engagement spring has a spring-loaded catch edge that engages with an engagement protrusion that is provided on a moveable component, and an insertion leg angled in front of the catch edge, and the engagement spring is designed as a separate part and is designed to slide along the retaining plate between an engagement position and a release position, where the engagement position is maintained by catch elements which can be overcome by the spring force in a closing direction, and the catch elements are formed from a spring-loaded latch incorporated in the retaining plate, and a recess provided in a sliding plate of the engagement spring to hold the latch.

2. The retaining spring according to claim 1, wherein the resistance against the disengagement of the latch is greater than the resistance to overcome the spring force of the engagement spring arising from pressing in the catch protrusion against the insertion leg.

3. The retaining spring according to claim 1, wherein a free end of the insertion leg includes a retaining leg.

4. The retaining spring according to claim 1, wherein a sliding plate of said engagement spring has two elastic spring fingers at a side edge and said sing fingers can be pushed downward and their angled orientation is aligned opposite the insertion direction so that the spring fingers rest against side edges of a guide piece of said retaining plate after the insertion of the sliding plate.

5. A retaining spring for connection of a fixed component and a slidable component comprising:
a retaining plate secured to the fixed component having a clamp and a latch;
an engagement protrusion extending upwardly from the sliding component; and
an engagement spring slidably secured to and protruding from said retaining plate, said engagement spring having a recess and having a catch edge that is secured over said engagement protrusion, and an insertion leg extending from said catch edge, said engagement spring being adapted to slide along the retaining plate between an engagement position and a release position; wherein said latch engages said recess in an engagement position, and said sliding plate of said engagement spring includes a first and a second spring finger, said spring fingers being adapted to rest against said side edges of said guides when said engagement spring is in the engagement position.

6. The retaining spring of claim 5, wherein said retaining plate defines a groove, said groove receiving said latch as said engagement spring is moved over said retaining plate.

7. The retaining spring of claim 5, wherein said retaining plate further comprises a stop edge adapted to block movement of said engagement spring on said retaining plate.

8. The retaining spring of claim 5, wherein said retaining plate further comprises a catch bar that extends into a retaining portion of said clamp.

9. The retaining spring of claim 5, wherein said engagement spring further comprises a retaining leg extending from said insertion leg.

10. A retaining spring for connection of two components comprising:
a retaining plate having a clamp, a first guide and a second guide and a latch, each of said guides having a side edge; and
an engagement spring having a recess and having a sliding plate, a catch edge and an insertion leg extending from said catch edge, said sliding plate being slidably mounted between said guides such that said engagement spring is moveable along the retaining plate between an engagement position wherein said latch engages said recess and a release position, wherein said sliding plate comprises a first and a second spring finger, said spring fingers being adapted to rest against said side edges of said guides when said engagement spring is in the engagement position.

11. The retaining spring of claim 10, wherein said retaining plate defines a groove, said groove receiving said latch as said engagement spring is moved over said retaining plate.

12. The retaining spring of claim 10, wherein said retaining plate further comprises a stop edge adapted to block movement of said sliding plate on said retaining plate.

13. The retaining spring of claim 10, wherein said retaining plate further comprises a catch bar that extends into a retaining portion of said clamp.

14. The retaining spring of claim 10, wherein said engagement spring further comprises a retaining leg extending from said insertion leg.

* * * * *

UNITED STATES PATENT AND TRADEMARK OFFICE
CERTIFICATE OF CORRECTION

PATENT NO. : 6,921,227 B1  Page 1 of 1
APPLICATION NO. : 10/415634
DATED : July 26, 2005
INVENTOR(S) : Michael De Jong It is certified that error appears in the above-identified patent and that said Letters Patent is hereby corrected as shown below:

Column 4, Claim 4, Line 1, Replace "sing" with --spring--.

Signed and Sealed this

Nineteenth Day of December, 2006

JON W. DUDAS
*Director of the United States Patent and Trademark Office*